US012701183B1

(12) United States Patent
Newman et al.

(10) Patent No.: US 12,701,183 B1
(45) Date of Patent: Aug. 4, 2026

(54) REAL-TIME CALL QUALITY MONITORING AND MITIGATION VIA WEBHOOKS

(71) Applicant: Voxology Integrations, Inc., Newport Beach, CA (US)

(72) Inventors: Justin Newman, Newport Beach, CA (US); Sam Melvin, Newport Beach, CA (US)

(73) Assignee: Voxology Integrations, Inc., Newport Beach, CA (US)

( * ) Notice: Subject to any disclaimer, the term of this patent is extended or adjusted under 35 U.S.C. 154(b) by 121 days.

(21) Appl. No.: 18/537,616

(22) Filed: Dec. 12, 2023

Related U.S. Application Data

(60) Provisional application No. 63/476,110, filed on Dec. 19, 2022.

(51) Int. Cl.
H04M 3/22 (2006.01)

(52) U.S. Cl.
CPC ................................ H04M 3/2227 (2013.01)

(58) Field of Classification Search
CPC ...... H04M 3/2227; H04M 1/724; H04M 1/00; H04M 3/2236; H04M 3/22; H04L 65/80; H04L 43/16
See application file for complete search history.

(56) References Cited

U.S. PATENT DOCUMENTS

2008/0063149 A1* 3/2008 West ................... H04M 3/2236
379/1.03
2020/0022002 A1* 1/2020 Karanam ............ G10L 21/0364

* cited by examiner

*Primary Examiner* — Yosef K Laekemariam
(74) *Attorney, Agent, or Firm* — Knobbe, Martens, Olson & Bear, LLP

(57) ABSTRACT

Techniques for real-time call quality monitoring and mitigation via webhooks are provided. In some aspects, a quality monitoring and mitigation system includes a processor configured to obtain call quality data for a call between a first telephone and a second telephone and analyze the call quality data to detect one or more call quality indicators. The processor is further configured to detect a call quality issue based on the one or more call quality indicators and implement a mitigation strategy for the call quality issue.

21 Claims, 5 Drawing Sheets

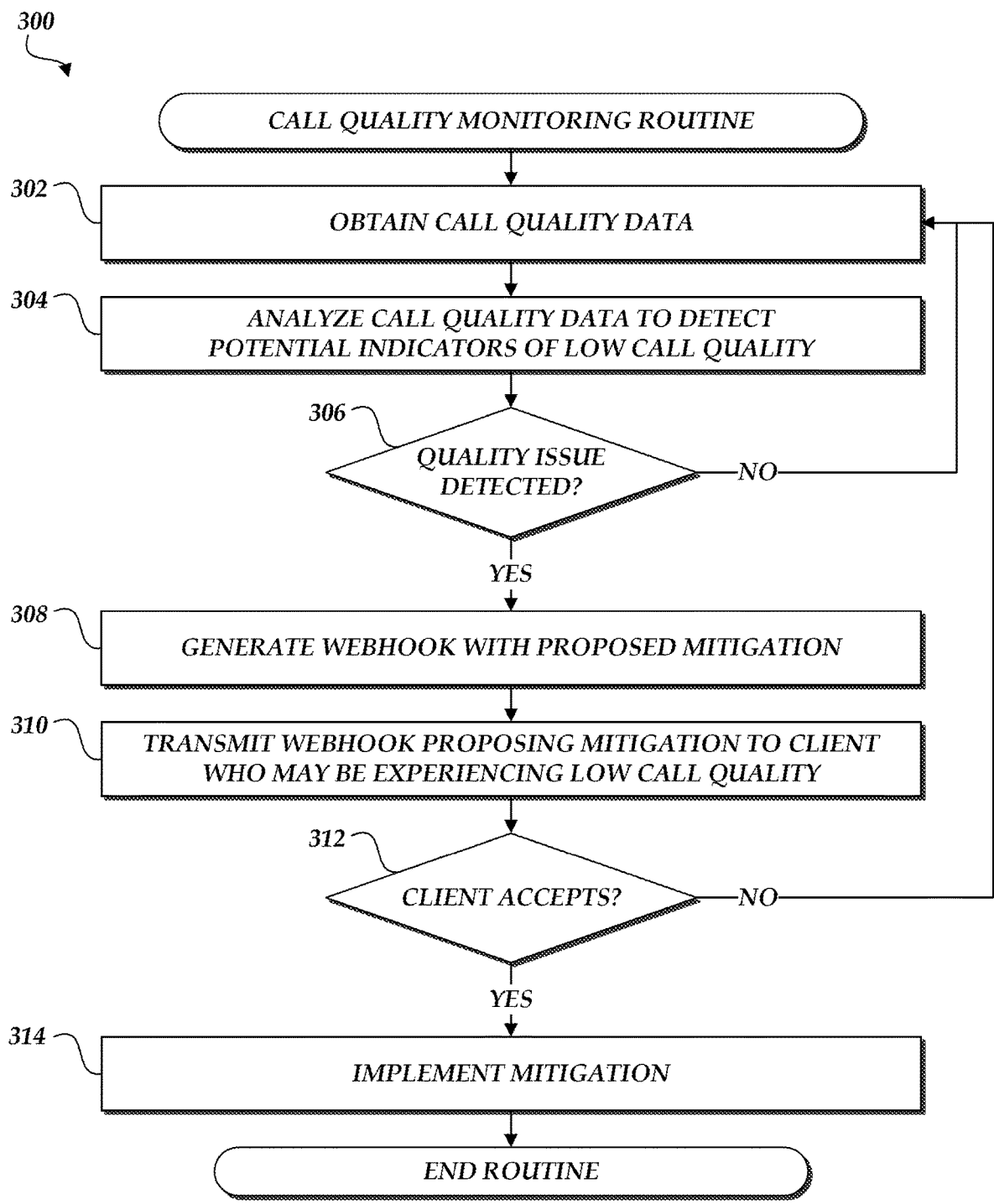

*300*

CALL QUALITY MONITORING ROUTINE

302 — OBTAIN CALL QUALITY DATA

304 — ANALYZE CALL QUALITY DATA TO DETECT POTENTIAL INDICATORS OF LOW CALL QUALITY

306 — QUALITY ISSUE DETECTED? — NO

YES

308 — GENERATE WEBHOOK WITH PROPOSED MITIGATION

310 — TRANSMIT WEBHOOK PROPOSING MITIGATION TO CLIENT WHO MAY BE EXPERIENCING LOW CALL QUALITY

312 — CLIENT ACCEPTS? — NO

YES

314 — IMPLEMENT MITIGATION

END ROUTINE

*Fig. 3*

REAL-TIME CALL QUALITY MONITORING AND MITIGATION VIA WEBHOOKS

CROSS-REFERENCE

This application claims the benefit of U.S. Provisional Application No. 63/476,110, filed Dec. 19, 2022. The foregoing application is hereby incorporated by reference in its entirety. Any and all applications for which a foreign or domestic priority claim is identified in the Application Data Sheet as filed with the present application are hereby incorporated by reference under 37 CFR 1.57.

SUMMARY OF CERTAIN ASPECTS

The present technology relates to techniques for real-time call quality monitoring and mitigation via webhooks.

A telecommunications provider may provide services to clients that make use of the Session Initiation Protocol ("SIP"), such as routing of inbound and outbound telephone calls on the public switched telephone network ("PSTN"). Certain factors, including those outside of the control of the telecommunications provider, may negatively impact the quality of a call between parties connected by the telecommunications provider. Thus, it is desirable to detect call quality issues and implement a mitigation strategy to improve the call quality.

The innovations described in the claims each have several aspects, no single one of which is solely responsible for its desirable attributes. Without limiting the scope of the claims, certain features and aspects of the present technology will now be briefly described.

One aspect of this disclosure is a quality monitoring and mitigation system, comprising: an electronic processor; and a non-transitory computer-readable memory having stored thereon instructions that, when executed by the processor, cause the processor to: obtain call quality data for a call between a first telephone and a second telephone; analyze the call quality data to detect one or more call quality indicators; detect a call quality issue using the one or more call quality indicators; determine a mitigation strategy for the call quality issue; and implement the mitigation strategy.

In some embodiments, the instructions further cause the processor to: generate a webhook including the mitigation strategy in response to detecting the call quality issue; transmit the webhook to a user of the first telephone; and receive instructions to implement the mitigation strategy, wherein implementing the mitigation strategy is in response to receiving the instructions.

In some embodiments, the call between the first telephone and the second telephone is facilitated via a carrier, and wherein the instructions further cause the processor to: generate a webhook including the mitigation strategy in response to detecting the call quality issue; transmit the webhook to the carrier; and receive instructions to implement the mitigation strategy in response to the carrier transmitting an indication to a user of the first telephone that the mitigation strategy is available, wherein implementing the mitigation strategy is in response to receiving the instructions.

In some embodiments, the indication transmitted to the user of the first telephone comprises an audio prompt.

In some embodiments, the instructions further cause the processor to: generate a webhook including the mitigation strategy in response to detecting the call quality issue; transmit the webhook to a server; and receive instructions to implement the mitigation strategy in response to the server transmitting an indication to a user of the first telephone that the mitigation strategy is available, wherein implementing the mitigation strategy is in response to receiving the instructions.

In some embodiments, the indication transmitted to the user comprises: an email, a push notification, or a text message.

In some embodiments, the instructions further cause the processor to: determine that a severity of the call quality issue is greater than a threshold severity level, wherein implementing the mitigation strategy is in response to determining that the severity of the call quality issue is greater than the threshold severity level.

In some embodiments, the call quality indicators comprise one or more indicators relates to: packet loss, call silence, call content, or audio waveforms associated with low call quality.

Another aspect of this disclosure is a computer-implemented method for quality monitoring and mitigation system, the method comprising: obtaining call quality data for a call between a first telephone and a second telephone; analyzing the call quality data to detect one or more call quality indicators; detecting a call quality issue using the one or more call quality indicators; and implementing a mitigation strategy for the call quality issue.

In some embodiments, the method further comprises: generating a webhook including the mitigation strategy in response to detecting the call quality issue; transmitting the webhook to a user of the first telephone; and receiving instructions to implement the mitigation strategy, wherein implementing the mitigation strategy is in response to receiving the instructions.

In some embodiments, the call between the first telephone and the second telephone is facilitated via a carrier, and wherein the method further comprises: generating a webhook including the mitigation strategy in response to detecting the call quality issue; transmitting the webhook to the carrier; and receiving instructions to implement the mitigation strategy in response to the carrier transmitting an indication to a user of the first telephone that the mitigation strategy is available, wherein implementing the mitigation strategy is in response to receiving the instructions.

In some embodiments, the indication transmitted to the user of the first telephone comprises an audio prompt.

In some embodiments, the method further comprises: generating a webhook including the mitigation strategy in response to detecting the call quality issue; transmitting the webhook to a server; and receiving instructions to implement the mitigation strategy in response to the server transmitting an indication to a user of the first telephone that the mitigation strategy is available, wherein implementing the mitigation strategy is in response to receiving the instructions.

In some embodiments, the indication transmitted to the user comprises: an email, a push notification, or a text message.

In some embodiments, the method further comprises: determining that a severity of the call quality issue is greater than a threshold severity level, wherein implementing the mitigation strategy is in response to determining that the severity of the call quality issue is greater than the threshold severity level.

In some embodiments, the call quality indicators comprise one or more indicators relates to: packet loss, call silence, call content, or audio waveforms associated with low call quality.

Yet another aspect of this disclosure is a non-transitory computer-readable medium having stored therein instructions that, when executed by an electronic processor, cause the processor to: obtain call quality data for a call between a first telephone and a second telephone; analyze the call quality data to detect one or more call quality indicators; detect a call quality issue based on the one or more call quality indicators; and implement a mitigation strategy for the call quality issue.

In some embodiments, the instructions further cause the processor to: generate a webhook including the mitigation strategy in response to detecting the call quality issue; transmit the webhook to a user of the first telephone; and receive instructions to implement the mitigation strategy, wherein implementing the mitigation strategy is in response to receiving the instructions.

In some embodiments, the call between the first telephone and the second telephone is facilitated via a carrier, and wherein the instructions further cause the processor to: generate a webhook including the mitigation strategy in response to detecting the call quality issue; transmit the webhook to the carrier; and receive instructions to implement the mitigation strategy in response to the carrier transmitting an indication to a user of the first telephone that the mitigation strategy is available, wherein implementing the mitigation strategy is in response to receiving the instructions.

In some embodiments, the indication transmitted to the user of the first telephone comprises an audio prompt.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3 is a flow chart depicting an example routine for monitoring call quality and generating webhooks in response to call quality issues in accordance with aspects of the present disclosure.

DETAILED DESCRIPTION

Figure 1:
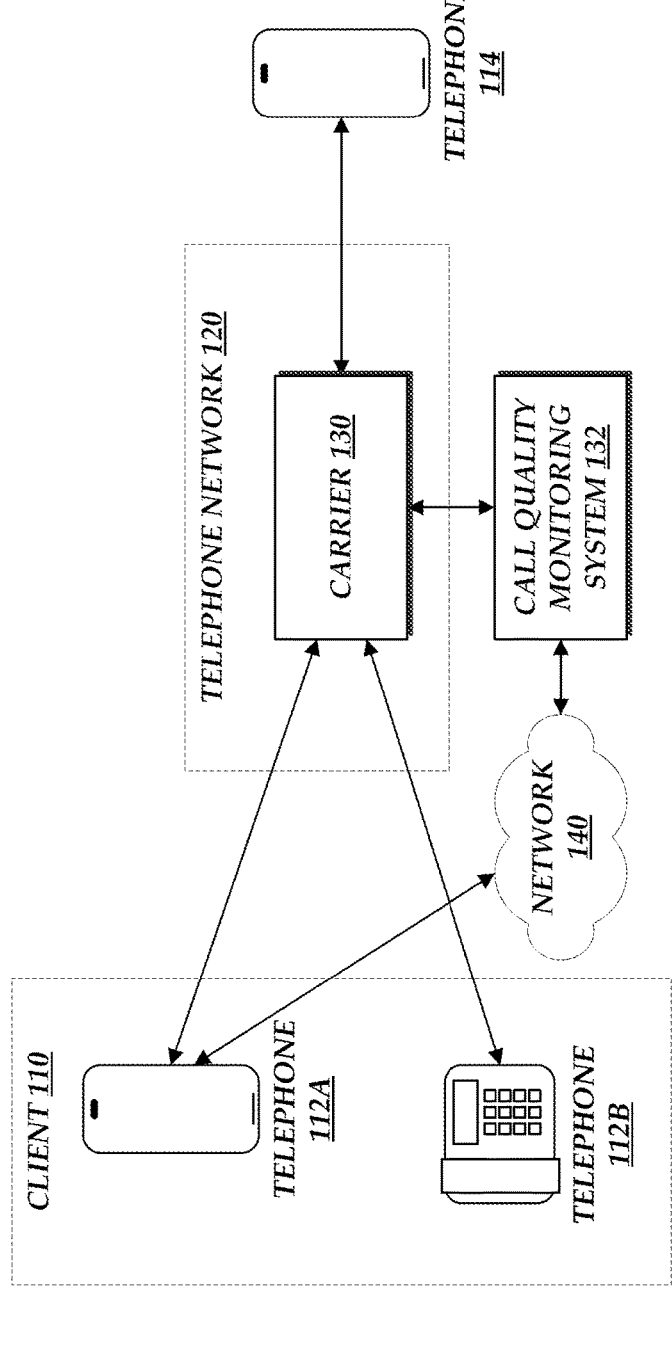
FIG. 1 is a block diagram depicting an example operating environment in which a call quality monitoring system may operate in accordance with aspects of the present disclosure.

Generally described, aspects of the present disclosure relate to telecommunications. More specifically, aspects of the present disclosure are directed to systems, methods, and computer-readable media related to a call quality monitoring system that mitigates call quality issues by generating webhooks and providing a user with mitigation options (e.g., options for reducing or eliminating such issues) while a call is in progress. Illustratively, telecommunications service providers or "carriers" may provide services to clients such as telephone services, teleconferencing services, and the like. These services may operate on the public switched telephone network ("PSTN"), a portion of which may be operated by the carrier.

However, only a portion of the PSTN is subject to the carrier's direct control, and other portions of the PSTN are operated by third parties. The carrier may thus find that the quality of the telecommunications services it provides is sometimes dependent on circuits and networks that are maintained by these third parties, and as a result the quality of services that the carrier provides on the PSTN may vary. For example, clients of the carrier may sometimes experience "bad connections" and have difficulty communicating. Service quality may also be affected if the client or a third party is connecting to the PSTN via a cellular or other wireless connection. Even if all the equipment used to facilitate the call is in good working order, radio interference or other wireless issues may affect call quality. Symptoms of these call quality issues may include lost or garbled audio, echo, delay, static, periods of silence, or other impediments to communication.

To address these and/or other issues, a carrier may implement a call quality monitoring system as described herein. The call quality monitoring system may, in some embodiments, detect call quality issues as they occur, and may generate, propose, and implement strategies to mitigate (e.g., reduce or eliminate) these issues while the call is in progress. As described in more detail below, the call quality monitoring system may resolve "bad connection" issues by establishing a new connection to the client and transferring the in-progress call to the new connection, digitally processing call audio to remove noise and increase signal, or otherwise mitigating or resolving call quality issues.

It will be understood that the call quality monitoring system described herein addresses a technical problem that specifically arises in the realm of computer networks, and in particular addresses a problem that arises in the realm of the PSTN. It will further be understood that the technical problem described herein is not analogous to any pre-Internet practice, and that the call quality monitoring system improves the performance of a carrier by mitigating call quality issues. By implementing the call quality monitoring system, a carrier may thus make more effective use of their network and provide telecommunications services more efficiently.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

FIG. 1 is a block diagram of an example operating environment 100 in which a carrier 130 in a telephone network 120 enables communication between a telephone 112A or 112B of a client 110 and a telephone 114 of a third party, and in which a call quality monitoring system 132 interacts with the carrier 130 and further interacts with the telephone 112A via a network 140. It will be understood that the example operating environment 100 may include more (or fewer) components than those depicted in FIG. 1. It is not necessary, however, that all of these generally conventional elements be shown in order to provide an enabling disclosure.

The telephone network 120 may illustratively be the public switched telephone network ("PSTN") or a portion thereof, and may include various other components for delivering telecommunications services beyond those depicted in FIG. 1. As depicted, the network 120 enables interaction between a telephone 112A or 112B of a client 110 and a telephone 114 of a third party via a carrier 130. The telephones 112A, 112B, and 114 may generally be any device that can make or receive calls on the network 120, including but not limited to landline telephones, mobile phones, smartphones, laptop or desktop computing devices, tablet computing devices, wearable devices, smart appliances, gaming devices, media players, or other such devices. It will be understood that the telephones 112A and 114 are depicted in FIG. 1 as smartphones, and that the telephone 112B is depicted as a landline phone, for purposes of example, and that the present disclosure is not limited to particular types of telephones.

The call quality monitoring system 132, which is described in more detail below with reference to FIG. 4, may generally be any combination of computer hardware and/or software that implements aspects of the present disclosure. In some embodiments, the call quality monitoring system 132 may include or communicate with a call quality criteria data store (not depicted in FIG. 1), which may be any non-transitory computer-readable data store, including but not limited to computer memory, magnetic media, optical media, solid state devices, or other data storage devices. In some embodiments, communications between the carrier 130 and the call quality monitoring system 132 may take place over a network, such as the network 140. In other embodiments, communications between the call quality monitoring system 132 and the telephone 112A may take place via the carrier 130. For example, the call quality monitoring system 132 may cause the carrier 130 to issue a notification and/or offer a potential action, such as to play a message to the telephone 112 (e.g., "We are detecting call quality issues. If you would like to transfer this call to your landline phone, press 1.").

The network 140 may illustratively be any wired or wireless network or combination thereof. For example, the network 140 may include a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 140 may be a private or semi-private network, such as a corporate or university intranet. The network 140 may include one or more wireless networks, such as a Global System for Mobile Communications (GSM) network, a Code Division Multiple Access (CDMA) network, a Long Term Evolution (LTE) network, or some other type of wireless network. The network 140 may use protocols and components for communicating via the Internet or any of the other aforementioned types of networks. In some embodiments, the network 140 and the network 120 may be the same network.

Figure 2A:
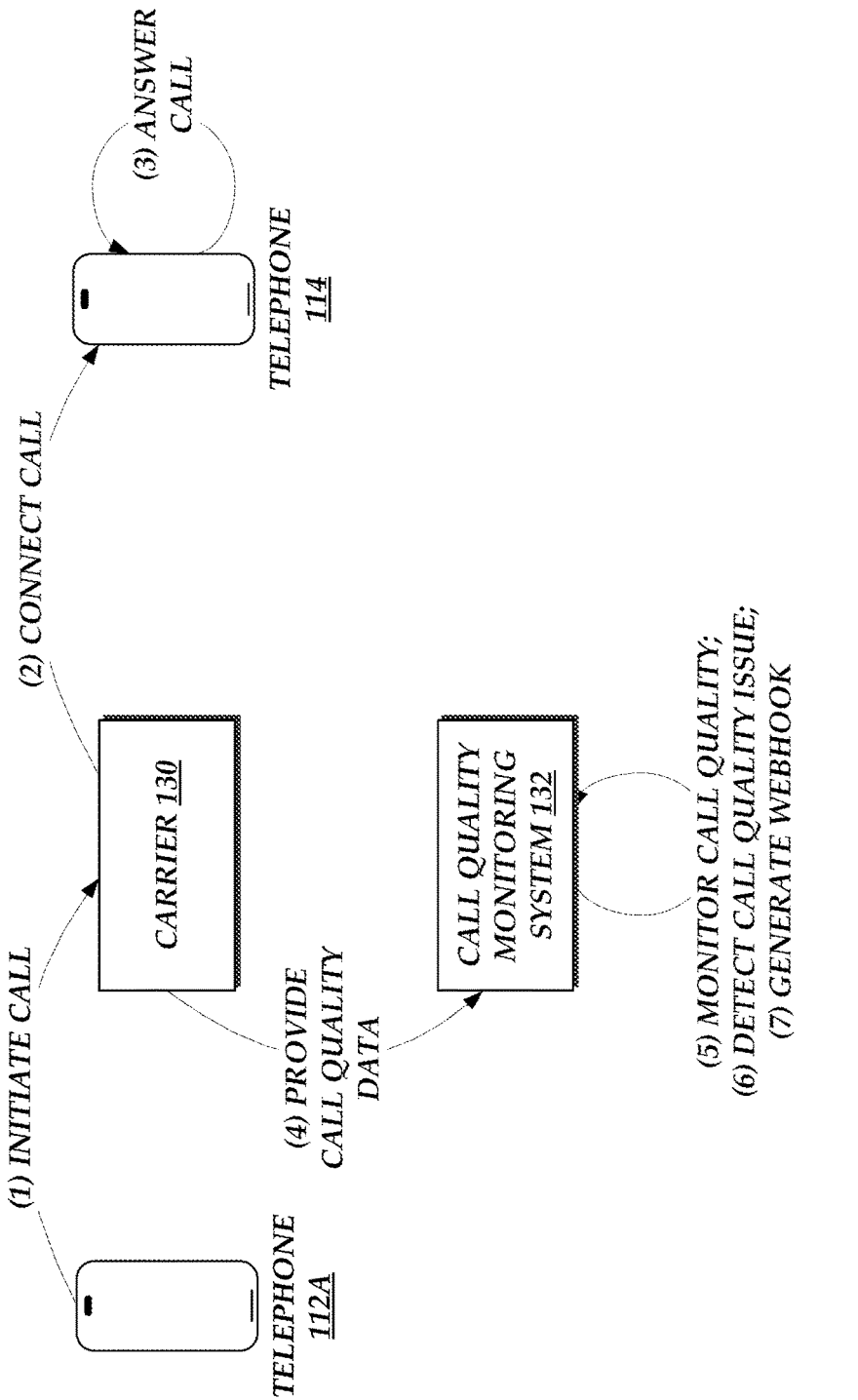
FIGS. 2A and 2B are flow diagrams depicting example interactions for real-time call quality monitoring and webhook-based mitigation in accordance with aspects of the present disclosure.
Figure 2B:
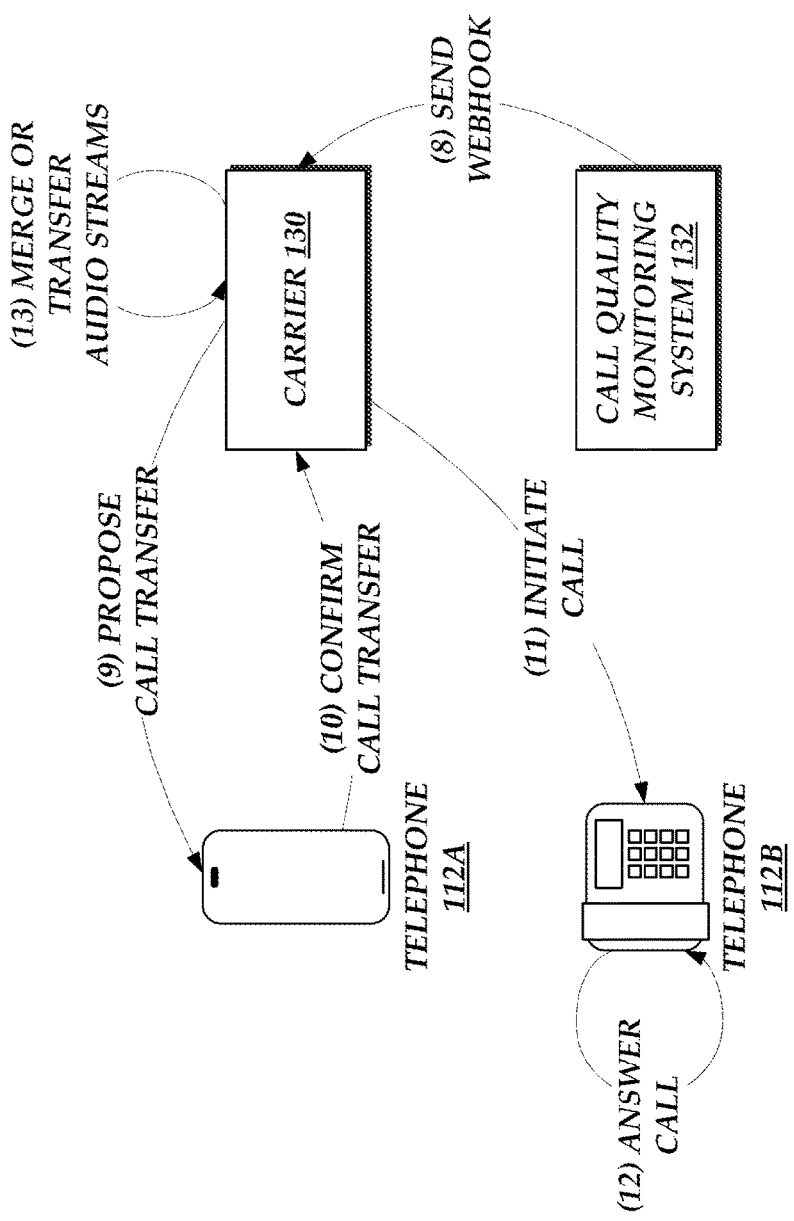

FIGS. 2A and 2B are flow diagrams depicting example interactions for monitoring call quality and mitigating call quality issues in accordance with aspects of the present disclosure. With reference now to FIG. 2A, the example interactions begin at element (1), where a user of a telephone 112A (e.g., the client 110) may initiate a phone call. At element (2), the phone call may be connected by a carrier 130 to a receiving party's telephone 114, and at element (3) the call may be answered. In some embodiments, the interactions at elements (1), (2), and (3) may instead represent an incoming call to the telephone 112A, such that the interactions begin with the telephone 114 initiating a call. In other embodiments, both the telephone 112A and the telephone 114 may initiate calls and may both be connected to a conference bridge or other teleconferencing service.

At element (4), the carrier 130 may provide call quality data to a call quality monitoring system 132. The call quality data may include, for example, information regarding packet loss, time periods during which the call is silent (which may or may not correspond to packet loss), static or other background noise, absence of background noise, detection of truncated and/or garbled words, detection of particular spoken words or phrases ("hello?", "can you hear me?", "I can't hear you", "are you still there?", "you're breaking up", etc.), and/or other data. In some embodiments, the carrier 130 may provide unprocessed information (e.g., all of the packets that being transmitted or received on the call) to the call quality monitoring system 132, and the call quality monitoring system 132 may process the information using a digital signal processor. In other embodiments, the carrier 130 may provide processed information.

At element (5), the call quality monitoring system 132 may monitor the quality of the call. The monitoring can be performed throughout the duration of the call, during a certain portion of the call (such as during an initial period of the call, e.g., the call's first 5 second, 10 seconds, 30 seconds, 1 minute, etc.), or periodically during the call (such as every 10 seconds, 30 seconds, 1 minute, etc.). In certain embodiments, the monitoring is performed by analyzing the call quality data provided at element (4). In some embodiments, the interaction at element (4) may be carried out on a periodic basis (e.g., once every 100 milliseconds, once per second, etc.), and the interaction at element (5) may also be carried out periodically, either at the same period or a different period than the interaction at element (4). For example, the interaction at element (4) may be carried out once every 100 milliseconds, and the interaction at element (5) may be carried out once per second. In some embodiments, the call quality monitoring system 132 may monitor call quality by taking a "rolling average" or performing a statistical analysis of call quality data that was collected in multiple time periods.

At element (6), in some embodiments, the call quality monitoring system 132 may detect a call quality issue. Illustratively, as discussed above, the call quality monitoring system 132 may detect indicators such as the call abruptly transitioning to silence, remaining silent for a threshold length of time, particular words or phrases being spoken by one of the parties (e.g., "I can't hear you," "what?", "say again," "there's a problem with the line," etc.), packet loss, word truncation or garbling, and the like. In some embodiments, the call quality monitoring system 132 may receive audio data in the interaction at element (4), and may use a digital signal processor to analyze audio waveforms. The call quality monitoring system 132 may thus identify waveforms or other patterns or indicia (e.g., by using a machine learning model trained to do so) that are associated with call quality issues. For example, the call quality monitoring system 132 may detect that one of the parties dialed into a conference bridge has placed the bridge on hold, with the result being that "hold music" is disrupting the call for the other participants. As further examples, the call quality monitoring system 132 may detect waveforms associated with background noise (e.g., car traffic, wind hitting the microphone, dog barking, baby crying, etc.), a muted microphone (e.g., a sudden absence of background noise), bandwidth or compression issues (e.g., "robotic"-sounding speech due to loss of pitch data), or other waveforms indicating a call quality issue. In some embodiments, the call quality monitoring system 132 may determine whether the call quality data satisfies a criterion. For example, the call quality monitoring system 132 may determine that a call quality issue has been detected for a threshold length of time or has reached a threshold level of severity.

At element (7), the call quality monitoring system 132 may generate a webhook, which may propose a mitigation strategy for the call quality issue. In some embodiments, the call quality monitoring system 132 may generate a webhook that, when transmitted to a text messaging server, causes a text message to be sent to the telephone 112A and/or to another computing device associated with the telephone 112A and/or the user (e.g., to another phone associated with the user such as the telephone 112B, to an email address associated with the user, etc.). The text message may offer, for example, to transfer the call to a different telephone available to the client (e.g., the telephone 112B) in order to mitigate the call quality issue. In other embodiments, the webhook may cause the carrier 130 to play an audio message (e.g., "We are detecting a call quality issue. If you'd like to transfer this call to your landline phone, press 1") or otherwise signal the user of the telephone 112A that a mitigation option is available. In yet other embodiments, the call quality monitoring system 132 may generate a webhook to be sent directly to the telephone 112A via a network (e.g., the network 140).

In some embodiments, the call quality monitoring system 132 may apply a criterion or criteria to determine an action, such as whether to generate a webhook or simply to implement the mitigation strategy. For example, the call quality monitoring system 132 may determine that the call quality issue is relatively minor, and may thus generate a webhook that offers a mitigation strategy. Alternatively, the call quality monitoring system 132 may determine that the call quality issue is severe enough that it should automatically implement a mitigation strategy rather than presenting the option to mitigate to the user of the telephone 112A. In other embodiments, a mitigation strategy may be passively applied (e.g., using digital signal processing to perform noise cancellation and improve the signal-to-noise ratio of a call) and the option that is presented to the user may be to discontinue the applied mitigation strategy.

With reference now to FIG. 2B, the call quality monitoring system 132 may, at element (8), send the webhook to the carrier 130. In some embodiments, as discussed above, the call quality monitoring system 132 may instead send the webhook to the telephone 112A or to another server or device that communicates with the telephone 112A or another device of the client. For example, the call quality monitoring system 132 may send the webhook to a server that is configured to send email or chat messages to the client, or may send the webhook to a push notification server or other server that communicates with a front-end application on the telephone 112A.

In the embodiment depicted in FIG. 2B, the interactions continue at element (9), where the webhook may cause the carrier 130 to play an audio message to the telephone 112A. For example, as discussed above, the carrier 130 may play an audio message that offers to transfer the call to the telephone 112B in an effort to mitigate the call quality issue. In some embodiments, the carrier 130 may play an audio message offering to place an outbound call to the telephone 112A (or the telephone 112B or telephone 114), and then use call waiting, call forwarding, or other functionality to transfer the call in progress to a different line or circuit. In some embodiments, the system offers the option to and/or is adapted to end the call and automatically redial and/or reconnect some or all of the participants on a new call.

At element (10), the telephone 112A transmits information to the carrier 130 that authorizes the proposed mitigation strategy (e.g., transferring the call to the telephone 112B). The carrier 130 may thus initiate a call to the telephone 112B at element (11), and the client may answer the call at element (12). At element (13), the carrier 130 may then transfer the call to the telephone 112B or otherwise merge the audio streams such that the telephone 112B joins the call in progress. In some embodiments, once the telephone 112B has joined the call in progress, the carrier 130 may disconnect the telephone 112A from the call.

In some embodiments, the call quality monitoring system 132 may determine whether implementation of the mitigation strategy improved call quality. For example, the call quality monitoring system 132 may compare call quality data that was collected prior to implementing the mitigation strategy to call quality data that was collected afterwards, or may determine whether post-mitigation data still satisfies a criterion. In some embodiments, the call quality monitoring system 132 determines whether, after implementation of the mitigation strategy, the call includes less than a threshold amount of noise, packet loss, or other indicia of poor call quality. In certain embodiments, the call quality monitoring system 132 determines whether the call after implementation of the mitigation strategy exhibits at least a certain decrease (e.g., 25%) in noise, packet loss, or other indicia of poor call quality compared to the call before implementation of the mitigation strategy. In further embodiments, the call quality monitoring system 132 may store information regarding successful and unsuccessful mitigations, and may use this information to refine its selection of mitigation strategies, the criteria used, the training of machine learning models, or otherwise improve its performance at mitigating call quality issues.

It will be understood that FIGS. 2A and 2B are provided for purposes of example, and that many variations on the depicted interactions are within the scope of the present disclosure. For example, as discussed above, the call quality monitoring system 132 may send a webhook to the telephone 112A in the interaction at (8), or may implement a mitigation strategy without proposing it or receiving confirmation first. As a further example, a mitigation strategy other than transferring the call to a different telephone 112B may be proposed. For example, the call may be a conference call, and the proposed mitigation strategy may be to open an alternate conference bridge and transfer all of the callers to the new bridge. FIGS. 2A and 2B are thus understood to be illustrative and not limiting.

FIG. 3 is a flow chart depicting an example routine 300 for monitoring call quality and mitigating call quality issues in accordance with aspects of the present disclosure. The routine may be carried out, for example, by the call quality monitoring system 132 depicted in FIG. 1. In some embodiments, all or part of the routine 300 may alternatively be carried out by the carrier 130 depicted in FIG. 1 or another server or component. The example routine 300 begins at block 302, where call quality data may be obtained. Illustratively, call quality data may be obtained from a carrier, such as the carrier 130. In some embodiments, some or all of the call quality data may be obtained from a mobile computing device, such as the telephone 112A or the telephone 114 depicted in FIG. 1.

At block 304, the call quality data may be analyzed to detect potential indicators of low call quality. As described above, potential indicators of low call quality may include indicators relating to packet loss, call silence, call content, audio waveforms associated with low call quality, and other indicators. In some embodiments, a machine learning model may be trained using training data that contains call quality issues, and the model may be used to determine or identify indicators of low call quality.

At decision block 306, a determination may be made as to whether a call quality issue has been detected. As discussed above, the determination may be as to whether a particular criterion has been satisfied by the call quality data. For example, the determination may be that the call has been silent for a threshold duration, or that a machine learning model has a threshold confidence level that an audio waveform processed by a digital signal processor is indicative of a call quality issue. If the determination at decision block 306 is that no call quality issues have been detected, then the routine 300 branches to 302 and iterates until either no further call quality data is available (e.g., because the call has ended) or until an issue is detected.

If the determination at decision block 306 is that a call quality issue has been detected, then at block 308 a webhook may be generated that may cause a potential mitigation strategy to be presented to the client. In some embodiments, as discussed above, a determination may be made that the call quality issue is of sufficient severity (e.g., has a severity that is greater than a threshold severity level) that the mitigation strategy should be implemented without delay instead of presenting the strategy to the client as an option to consider. In such embodiments, if a determination is made that the call quality issue is severe, the routine 300 may branch directly to block 314 and implement the mitigation strategy.

At block 310, the webhook may be transmitted to the client. As discussed above, in various embodiments, the webhook may be transmitted directly or indirectly to a smartphone or other mobile computing device (e.g., the telephone 112A depicted in FIG. 1), to another computing device associated with the client (e.g., a laptop or desktop computing device, tablet computing device, wearable computing device, etc.), and/or to an application on one of these computing devices. In some embodiments, the webhook may be transmitted to the carrier facilitating the call, which may transmit an audio prompt or other signal to the client to indicate that a call quality mitigation strategy is available. In other embodiments, the webhook may be transmitted to a server that generates emails, push notifications, text messages, or otherwise informs the client that a call quality mitigation strategy is available.

At decision block 312, a determination is made as to whether the client has accepted or otherwise instructed the carrier to implement the call quality mitigation strategy. If not, then the routine 300 returns to block 302 and continues obtaining and analyzing call quality data. In some embodiments, the routine 300 may increase the threshold for detecting a call quality issue at decision block 306 in order to avoid repeatedly prompting the client to consider a mitigation strategy that the client has already declined. In other embodiments, the routine 300 may end if the client rejects the proposed mitigation strategy. Additionally, in some embodiments, the proposed mitigation strategy may be declined implicitly. For example, the carrier may play an audio message that says "press one if you would like to transfer the call to your landline phone," and the determination may be that a sufficient amount of time has elapsed without the client pressing one.

If the determination at decision block 312 is that the client has accepted the proposed mitigation strategy, then at block 314 the mitigation strategy may be implemented. In various embodiments, as discussed in more detail above, the mitigation strategy may include transferring the call to another line, placing a new call to the client telephone currently in use and then merging audio streams, opening a new conference bridge and transferring all the participants to that bridge, placing a new call to the third party telephone currently in use, or other strategies for circumventing or mitigating a call quality issue.

In some embodiments, as discussed above, the routine 300 may include a determination of whether the implemented mitigation strategy resolved the call quality issue. For example, a determination may be made based on a comparison between call quality data obtained after the mitigation strategy is implemented and call quality data obtained previously. In further embodiments, a second mitigation strategy may be proposed if the first mitigation strategy did not succeed at resolving the call quality issue. As discussed above, in some embodiments the determination may be used to revise or refine proposed mitigation strategies, train machine learning models, or otherwise improve the performance of the call quality monitoring system. In some embodiments, after block 314 the routine 300 may return to decision block 306.

It will be understood that FIG. 3 is provided for purposes of example, and that many variations on the depicted routine 300 are within the scope of the present disclosure. For example, the analysis at block 304 may identify a type of call quality issue (e.g., background noise, silence, etc.) and determine a mitigation strategy based on the type of issue. As a further example, the routine 300 may obtain historical information regarding acceptance rates for previously proposed mitigation strategies for a particular client, and may determine whether to propose a mitigation strategy based on the historical information. FIG. 3 is thus understood to be illustrative and not limiting.

Figure 4:
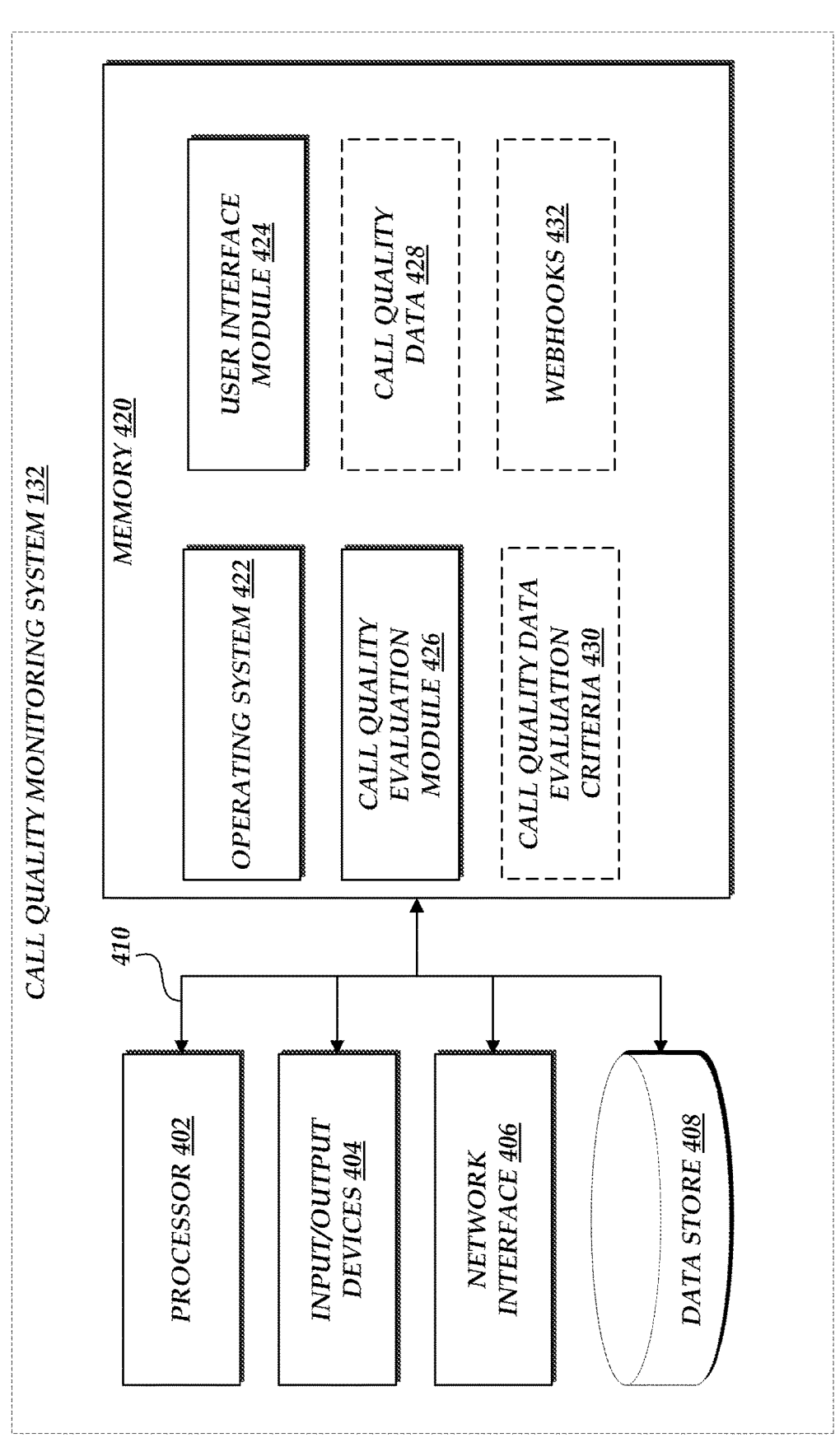
FIG. 4 is a block diagram depicting a general architecture of a computing device that is configured to implement a call quality monitoring system in accordance with aspects of the present disclosure.

FIG. 4 depicts a general architecture of a computing system (referenced as the call quality monitoring system 132) that implements aspects of the present disclosure. The general architecture of the call quality monitoring system 132 depicted in FIG. 4 includes an arrangement of computer hardware and software modules that may be used to implement aspects of the present disclosure. The hardware modules may be implemented with physical electronic devices, as discussed in greater detail below. The call quality monitoring system 132 may include more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1.

As illustrated, the call quality monitoring system 132 includes a processor 402, input/output device interfaces 404, a network interface 406, a data store 408, and a memory 420, all of which may communicate with one another by way of a communication bus 410. The network interface 406 may provide connectivity to one or more networks or computing systems, such the network 140 depicted in FIG. 1. The processor 402 may thus receive information and instructions from other computing systems or services. The processor 402 may also provide output information for an optional display (not shown) via the input/output device interfaces 404. The input/output device interfaces 404 may also accept input from an optional input device (not shown).

The memory 420 may contain computer program instructions (grouped as modules in some embodiments) that the processor 402 executes in order to implement one or more aspects of the present disclosure. The memory 420 generally includes random access memory (RAM), read only memory (ROM) and/or other persistent, auxiliary or non-transitory computer readable media. The memory 420 may store an operating system 422 that provides computer program instructions for use by the processor 402 in the general administration and operation of the call quality monitoring system 132. The memory 420 may further include computer program instructions and other information for implementing aspects of the present disclosure. For example, in one embodiment, the memory 420 includes a user interface module 424 that generates interfaces (and/or instructions therefore) for interacting with other computing devices, e.g., via an API, CLI, and/or Web interface.

In addition to and/or in combination with the user interface module 424, the memory 420 may include a call quality evaluation module 426 that may be executed by the processor 402. In some embodiments, the call quality evaluation module 426 implements various aspects of the present disclosure, as described in more detail above. The memory 420 may further include call quality data 428, which, as described in more detail above, may be obtained from an external source (e.g., the carrier 130 depicted in FIG. 1) via the network interface 406. The memory 420 may further include call quality data evaluation criteria 430, which may be obtained from a data store (e.g., the data store 408) and used to assess whether a call quality issue has been detected. The memory 420 may further include webhooks 432, which may be generated as described above and transmitted to external servers or carriers. In some embodiments, the memory 420 may include, e.g., potential mitigation strategies, machine learning models, or other information.

In some embodiments, the call quality monitoring system 132 may include components other than those illustrated in FIG. 4. For example, the memory 420 may include client computing device information or information obtained from other sources and associated with call events. FIG. 4 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

In summary, various embodiments and examples of automated call quality monitoring systems, methods, and computer-readable media have been disclosed. Although the systems and methods have been disclosed in the context of those embodiments and examples, the technology of this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

What is claimed is:

1. A quality monitoring and mitigation system, comprising:
   an electronic processor; and
   a non-transitory computer-readable memory having stored thereon instructions that, when executed by the processor, cause the processor to:
      obtain call quality data for a call between a first telephone and a second telephone;
      analyze the call quality data to detect one or more call quality indicators;
      detect a call quality issue using the one or more call quality indicators;
      select a mitigation strategy for the call quality issue from among a set of mitigation strategies, the set of mitigation strategies comprising: i) transferring the call from the first telephone to a third telephone, and ii) transferring a conference call connecting the first telephone and the second telephone from a first conference bridge to a second conference bridge; and
      implement the selected mitigation strategy.

2. The system of claim 1, wherein the instructions further cause the processor to:
   generate a webhook including the mitigation strategy in response to detecting the call quality issue;
   transmit the webhook to a user of the first telephone; and
   receive instructions to implement the mitigation strategy, wherein implementing the mitigation strategy is in response to receiving the instructions.

3. The system of claim 1, wherein the call between the first telephone and the second telephone is facilitated via a carrier, and wherein the instructions further cause the processor to:
   generate a webhook including the mitigation strategy in response to detecting the call quality issue;
   transmit the webhook to the carrier; and
   receive instructions to implement the mitigation strategy in response to the carrier transmitting an indication to a user of the first telephone that the mitigation strategy is available,
   wherein implementing the mitigation strategy is in response to receiving the instructions.

4. The system of claim 3, wherein the indication transmitted to the user of the first telephone comprises an audio prompt.

5. The system of claim 1, wherein the instructions further cause the processor to:
   generate a webhook including the mitigation strategy in response to detecting the call quality issue;
   transmit the webhook to a server; and
   receive instructions to implement the mitigation strategy in response to the server transmitting an indication to a user of the first telephone that the mitigation strategy is available,
   wherein implementing the mitigation strategy is in response to receiving the instructions.

6. The system of claim 5, wherein the indication transmitted to the user comprises: an email, a push notification, or a text message.

7. The system of claim 1, wherein the instructions further cause the processor to:
   determine that a severity of the call quality issue is greater than a threshold severity level,
   wherein implementing the mitigation strategy is in response to determining that the severity of the call quality issue is greater than the threshold severity level.

8. The system of claim 1, wherein the call quality indicators comprise one or more indicators relates to: packet loss, call silence, call content, or audio waveforms associated with low call quality.

9. A computer-implemented method for quality monitoring and mitigation system, the method comprising:
   obtaining call quality data for a call between a first telephone and a second telephone;
   analyzing the call quality data to detect one or more call quality indicators;
   detecting a call quality issue using the one or more call quality indicators;
   selecting a mitigation strategy for the call quality issue from among a set of mitigation strategies, the set of mitigation strategies comprising: i) transferring the call from the first telephone to a third telephone, and ii) transferring a conference call connecting the first telephone and the second telephone from a first conference bridge to a second conference bridge; and
   implementing the selected mitigation strategy for the call quality issue.

10. The method of claim 9, further comprising:

generating a webhook including the mitigation strategy in response to detecting the call quality issue;

transmitting the webhook to a user of the first telephone; and receiving instructions to implement the mitigation strategy, wherein implementing the mitigation strategy is in response to receiving the instructions.

11. The method of claim 9, wherein the call between the first telephone and the second telephone is facilitated via a carrier, and wherein the method further comprises:

generating a webhook including the mitigation strategy in response to detecting the call quality issue;

transmitting the webhook to the carrier; and receiving instructions to implement the mitigation strategy in response to the carrier transmitting an indication to a user of the first telephone that the mitigation strategy is available, wherein implementing the mitigation strategy is in response to receiving the instructions.

12. The method of claim 11, wherein the indication transmitted to the user of the first telephone comprises an audio prompt.

13. The method of claim 9, further comprising:

generating a webhook including the mitigation strategy in response to detecting the call quality issue;

transmitting the webhook to a server; and receiving instructions to implement the mitigation strategy in response to the server transmitting an indication to a user of the first telephone that the mitigation strategy is available, wherein implementing the mitigation strategy is in response to receiving the instructions.

14. The method of claim 13, wherein the indication transmitted to the user comprises: an email, a push notification, or a text message.

15. The method of claim 9, further comprising:

determining that a severity of the call quality issue is greater than a threshold severity level, wherein implementing the mitigation strategy is in response to determining that the severity of the call quality issue is greater than the threshold severity level.

16. The method of claim 9, wherein the call quality indicators comprise one or more indicators relates to: packet loss, call silence, call content, or audio waveforms associated with low call quality.

17. A non-transitory computer-readable medium having stored therein instructions that, when executed by an electronic processor, cause the processor to:

obtain call quality data for a call between a first telephone and a second telephone;

analyze the call quality data to detect one or more call quality indicators;

detect a call quality issue based on the one or more call quality indicators;

select a mitigation strategy for the call quality issue from among a set of mitigation strategies, the set of mitigation strategies comprising: i) transferring the call from the first telephone to a third telephone, and ii) transferring a conference call connecting the first telephone and the second telephone from a first conference bridge to a second conference bridge; and implement the selected mitigation strategy for the call quality issue.

18. The non-transitory computer-readable medium of claim 17, wherein the instructions further cause the processor to:

generate a webhook including the mitigation strategy in response to detecting the call quality issue;

transmit the webhook to a user of the first telephone; and receive instructions to implement the mitigation strategy, wherein implementing the mitigation strategy is in response to receiving the instructions.

19. The non-transitory computer-readable medium of claim 17, wherein the call between the first telephone and the second telephone is facilitated via a carrier, and wherein the instructions further cause the processor to:

generate a webhook including the mitigation strategy in response to detecting the call quality issue;

transmit the webhook to the carrier; and receive instructions to implement the mitigation strategy in response to the carrier transmitting an indication to a user of the first telephone that the mitigation strategy is available, wherein implementing the mitigation strategy is in response to receiving the instructions.

20. The non-transitory computer-readable medium of claim 19, wherein the indication transmitted to the user of the first telephone comprises an audio prompt.

21. The system of claim 1, wherein the instructions further cause the processor to:

determine that the one or more call quality indicators indicate that the call quality issue is above a severity threshold, wherein the mitigation strategy is implemented passively without presenting the mitigation strategy to a user in response to determining that the one or more call quality indicators indicate that the call quality issue is above the severity threshold.

* * * * *